J. B. KING, W. E. HUGHES & F. W. HALL.
MAUSOLEUM CONSTRUCTION.
APPLICATION FILED NOV. 12, 1909.

998,908.

Patented July 25, 1911.
5 SHEETS—SHEET 1.

Witnesses

Inventors
James B. King
William E. Hughes &
Frank W. Hall,

By

Merkel, Attorney

J. B. KING, W. E. HUGHES & F. W. HALL.
MAUSOLEUM CONSTRUCTION.
APPLICATION FILED NOV. 12, 1909.

998,908.

Patented July 25, 1911
5 SHEETS—SHEET 4.

Witnesses
Herman Eisele
Curt B. Mueller

Inventors
James B. King,
William E. Hughes,
Frank W. Hall,
By A. E. Merkel, Attorney J. B. KING, W. E. HUGHES & F. W. HALL.
MAUSOLEUM CONSTRUCTION.
APPLICATION FILED NOV. 12, 1909.
998,908.
Patented July 25, 1911.
5 SHEETS—SHEET 5.
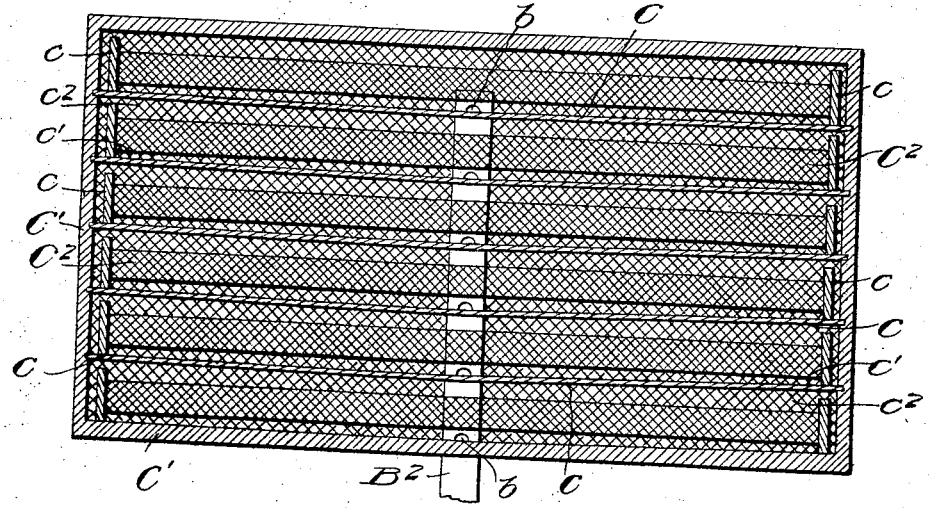
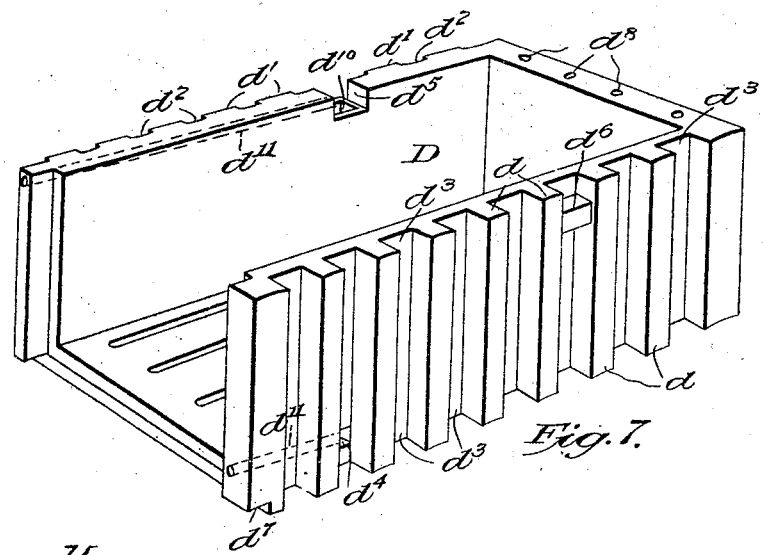
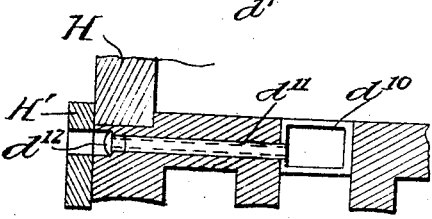
Witnesses
Inventors
James B. King
William E. Hughes
Frank W. Hall,
By
Attorney

UNITED STATES PATENT OFFICE.

JAMES B. KING AND WILLIAM E. HUGHES, OF CLYDE, OHIO, AND FRANK W. HALL, OF DETROIT, MICHIGAN.

MAUSOLEUM CONSTRUCTION.

998,908. Specification of Letters Patent. Patented July 25, 1911.

Application filed November 12, 1909. Serial No. 527,744.

*To all whom it may concern:*

Be it known that we, JAMES B. KING and WILLIAM E. HUGHES, citizens of the United States, and residents of Clyde, county of Sandusky, and State of Ohio, and FRANK W. HALL, a citizen of the United States, and a resident of Detroit, county of Wayne, and State of Michigan, have invented a new and useful Improvement in Mausoleum Constructions, of which the following is a specification, the principle of the invention being herein explained and the best mode in which we have contemplated applying that principle, so as to distinguish it from other inventions.

Our invention relates to mausoleum constructions, its object being to render such mausoleums dry upon the interior thereof, to provide a circulation of dry air through the individual crypts of the mausoleum whereby desiccation of the contents of such crypts may be obtained, and putrefaction thereby prevented; and further to provide a construction economical in cost, erection and maintenance.

The said invention consists of means hereinafter fully described and particularly set forth in the claims.

The annexed drawings and the following description set forth in detail certain means embodying our invention, the disclosed means, however, constituting but one of various mechanical forms in which the principle of the invention may be applied.

Figure 1:
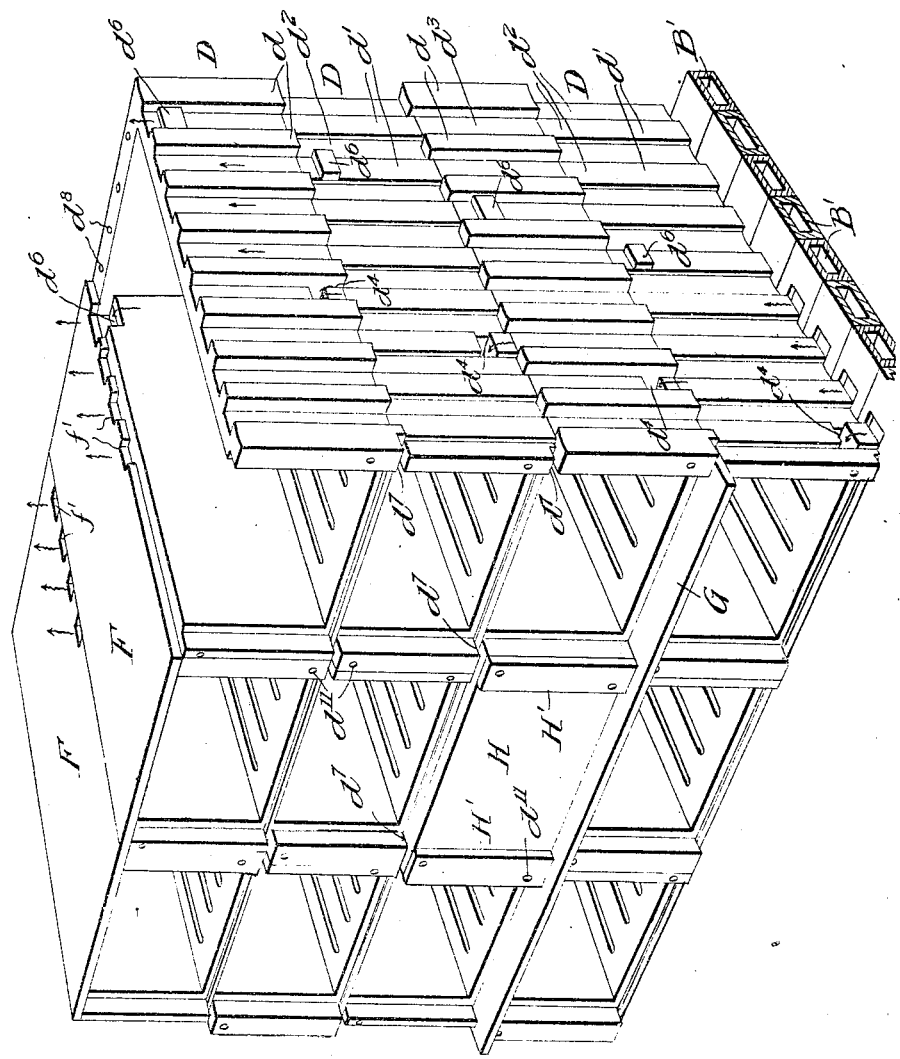
Figure 2:
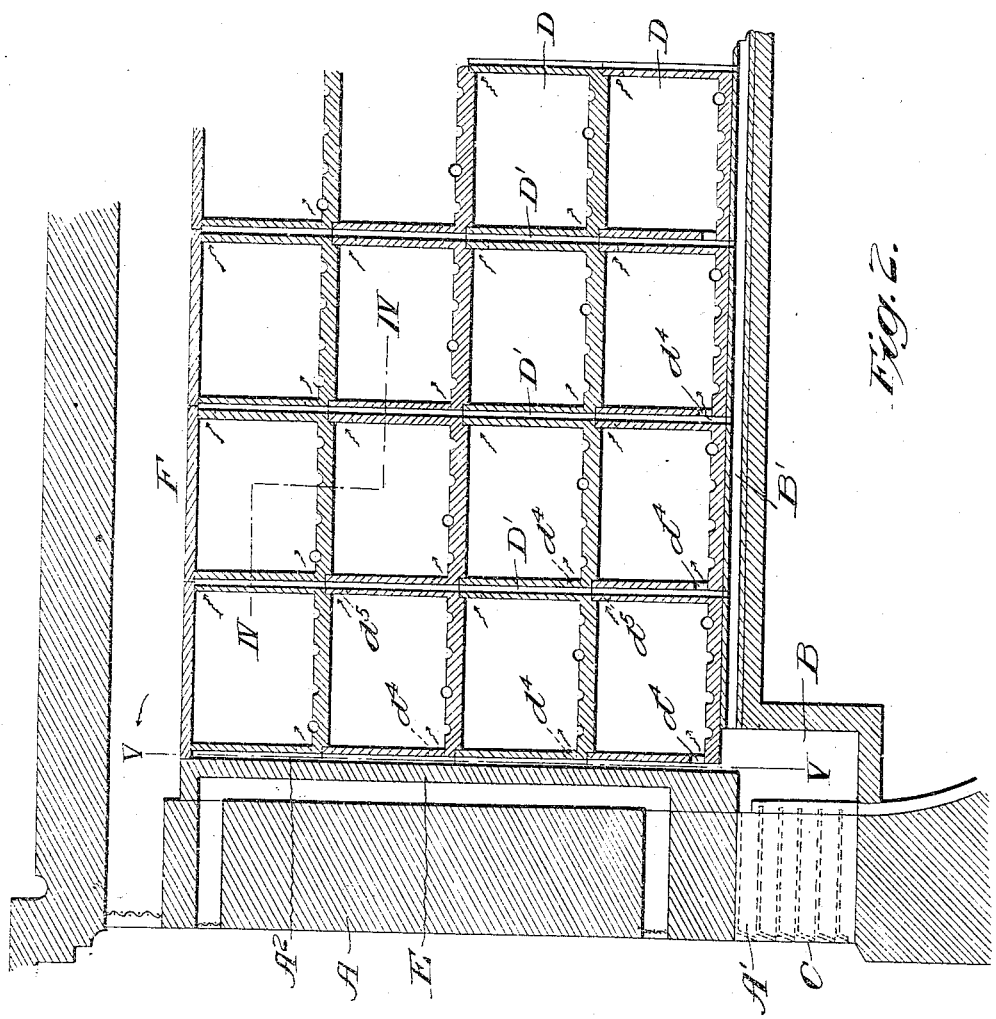
Figure 3:
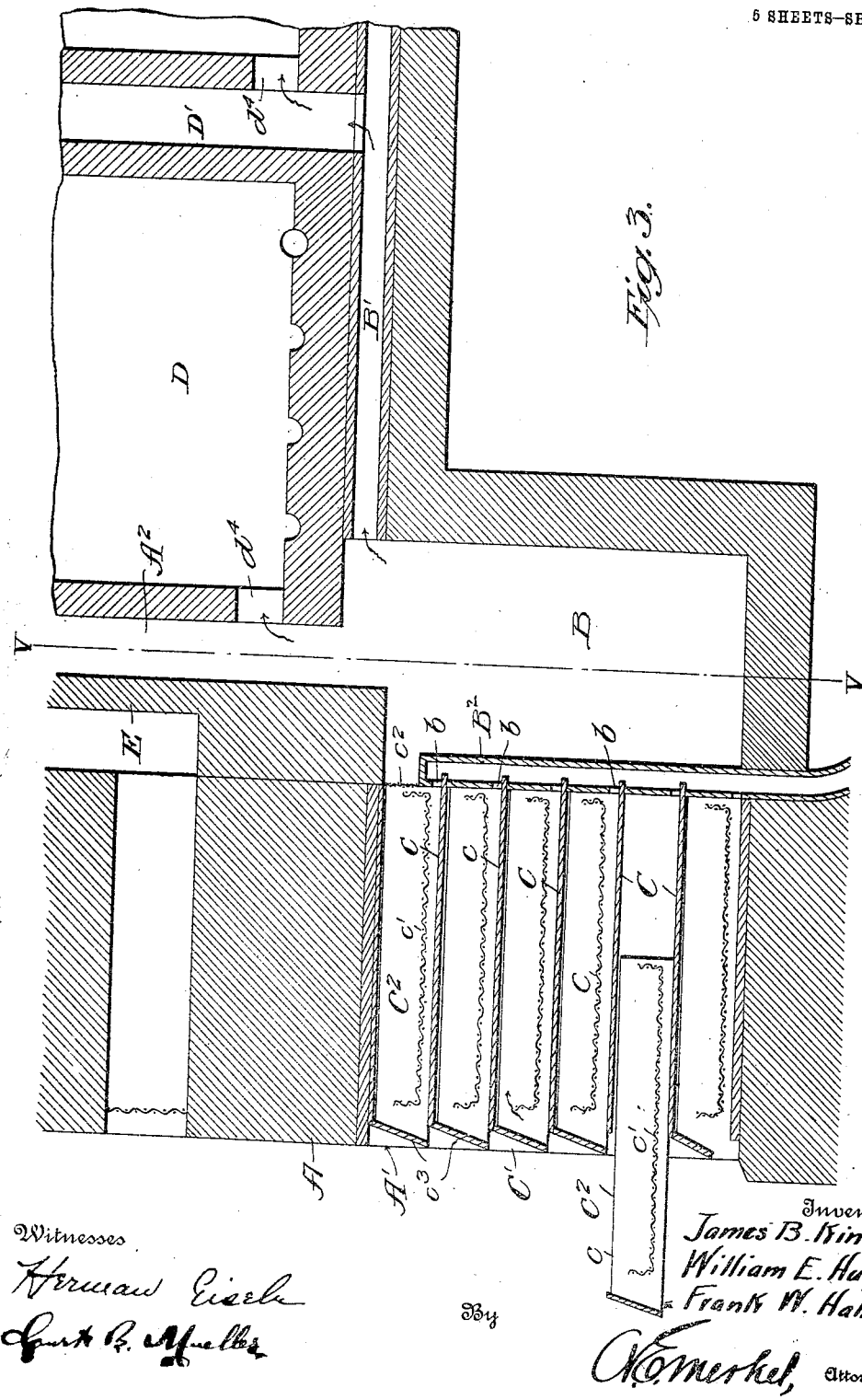
Figure 4:
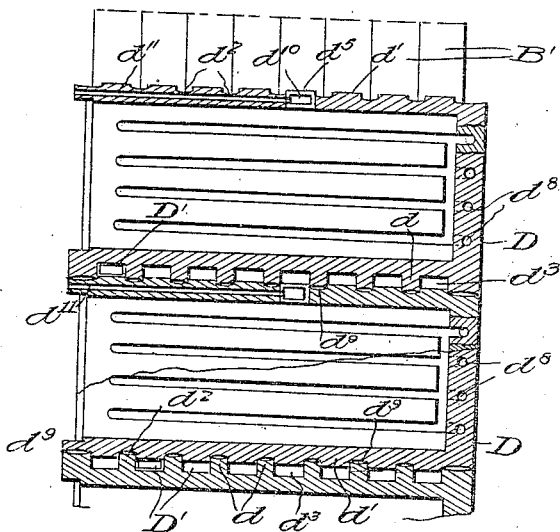
Figure 5:
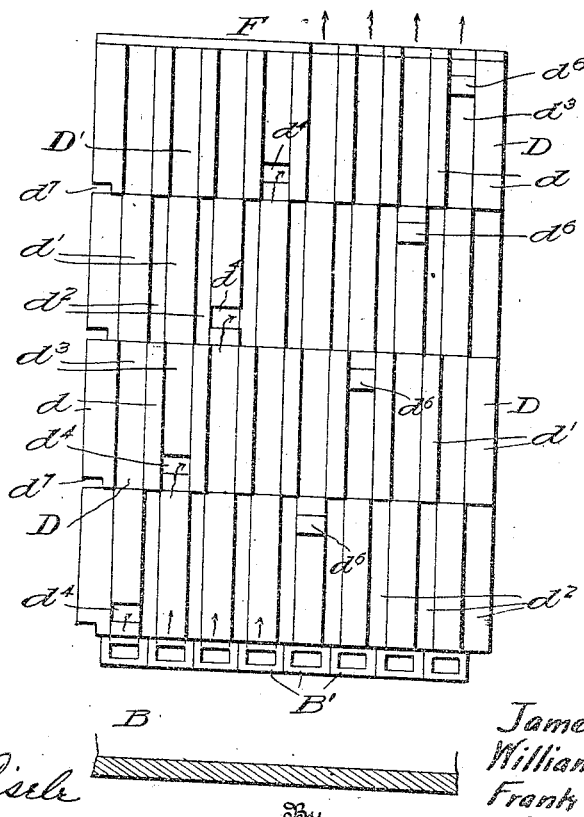

Figure 1 is a perspective of a group of receiving-crypts detached from a mausoleum of which they form a part, and which embodies our invention, certain portions being omitted for the purpose of disclosing the various details thereof. Fig. 2 is a fragmentary vertical longitudinal section of a mausoleum embodying our invention, and taken upon a plane passing transversely through one group of receiving crypts embodied therein. Fig. 3 is a fragmentary longitudinal section of one end of the building, and drawn upon an enlarged scale. Fig. 4 is a horizontal broken section taken upon the planes indicated by lines IV—IV of Fig. 2. Fig. 5 is a vertical section taken upon the plane indicated by line V—V of Figs. 2 and 3. Fig. 6 is a vertical transverse section of the air-drying apparatus forming a part of our invention. Fig. 7 is a perspective of one of the receiving-crypt structures. Fig. 8 is a fragmentary horizontal section, taken upon an enlarged scale, of one of such receptacle crypt structures.

The mausoleum comprises the usual foundation, floor, walls and roof, together with the tiers and columns of receiving-crypts arranged in the usual manner upon opposite sides of a main hall or lobby, as illustrated and described in our Patent No. 949,771, issued February 22, 1910, an air space being provided above the crypt structures, and suitable ventilators being also provided in the walls for permitting such air space to communicate with the atmosphere upon the exterior of the building. As further shown and described in said above mentioned patent, the mausoleum embodying our present invention also includes a plurality of ducts connecting with inlet and outlet openings formed in the sides of each receiving-crypt, the inlet ducts communicating at their lower ends with the atmosphere, and the outlet ducts communicating with the air-space above the crypts. In its general features therefore, the mausoleum embodying the present invention is similar to that forming the subject matter of the above named patent. The particular means for carrying out the principles of said invention are, however, different in the present invention, and we will therefore proceed to describe the same in detail.

The front wall A of the building is provided at its lower portion with an opening A', which is preferably located below the bottom of the interior of the lowermost tier of receiving-crypts. Upon the side of the structure and adjacent to such opening is an air-space B, Figs. 2 and 3, which communicates with the longitudinal floor ducts B', which pass below and transversely of the receiving-crypts, as shown. This air-space is made of a dimension in a transverse direction with reference to the crypts, sufficient to permit each of the said ducts B' to communicate with such space, as shown in Fig. 5. Intermediately of such space and the exterior and located in the opening A' is an air-drying apparatus. As illustrated, this apparatus consists of a plurality of superposed duplicate devices which may vary in number from one to any desired number above one. A description of one of such devices will therefore suffice for all of them.

The opening A' is divided horizontally by shelves C fixed permanently to a lateral frame structure C' which is itself permanently fixed in said opening, such frame being shown in Figs. 3 and 6. Resting upon each shelf is a drawer C² consisting of two upright sides c c, Fig. 6, which rest upon the shelf below and which carry suspended between them a short distance above such shelf a perforate tray c'. The back of each drawer space is closed by means of a suitable screen c², which prevents the admission of insects or animals from without the building into the interior of the same. Located upon the interior of the space B is an upright pipe B² which communicates by means of suitable openings b with each of the shelves C. These latter are preferably inclined slightly from the sides inwardly, and from the front backwardly, so as to cause any moisture or other liquid forming thereon to flow through the openings b into the pipe B². This pipe is carried downwardly into the earth, and may be caused to discharge into a sewer or other receptacle for such liquids.

Each tray c' contains a drying substance, such as chlorid of lime or similar material, capable of readily absorbing moisture, and as shown in the drawings, said trays have their upper surfaces removed some distance below the adjacent upper sheet or upper limit of the opening, as the case may be, whereby the air from the exterior of the building is permitted to pass over the chemical drying-substance, and so into the space B and through the crypts. The front ends of the trays C' terminate some distance inwardly of the drawer, and the exterior of each of the latter is provided with an outwardly and downwardly inclined weather strip c³, as shown in Fig. 3. These weather strips overlap each other so that when the drawers are all occupying their inward positions, rain from the exterior is not permitted to enter and reach the shelves C. When it is desired to charge the trays with a drying substance, each of them may be pulled outwardly for that purpose, as will be readily understood, one such withdrawn drawer being shown in Fig. 3. By providing a plurality of shelves, and a drawer for each self, it is seen that a considerable drying area may be provided over which the air may be caused to flow before entering the mausoleum.

The major portion of each receiving-crypt structure is formed of one single cast or molded device D of general rectangular form, and which forms the bottom, sides and back of such receptacle, as shown in Fig. 7. The sides of each of these structures are formed as shown with tongues and grooves, the tongues on the one side being of greater depth than those upon the other side, as shown in Figs. 4 and 7.

Referring now to the crypt-structures D in one horizontal tier, all of the structures in such tier have their longer tongues d situated upon the same side, all of the shorter tongues d' being located upon the opposite side, as shown in Fig. 4. These structures are then placed side by side, so as to cause the long tongues d of the one structure to engage the shallow grooves d² of the laterally adjacent structure, the shorter tongues d' engaging the deeper grooves d³ formed by the longer tongues d, as will be readily understood. The adjacent surfaces of the shallow grooves d² and the long tongues d are made of concave form, as shown in Fig. 4, whereby an elliptical space d⁰ is left between them, which is filled with cement or other binder. When these structures are placed side by side as described, vertical ducts D' are formed by the longer tongues d and shallow grooves d², as shown in Fig. 4. In the tier of receptacle structures above or below the tier just described, as the case may be, the location of the long and short tongues is reversed, as shown in Fig. 1, so that the structures of the one tier may be referred to as right handed, and the structures of the adjacent tier above or below, as the case may be, may be referred to as left handed. The receiving-crypt structures are therefore laid beside each other to form tiers, and piled upon each other to form vertical columns, the tiers being constructed alternately of right and left handed structures, all of the elements of any one tier being composed of structures of uniform character. The location of the tongues upon the sides of all of the structures is made such as to cause the grooves formed to aline vertically with each other to combine all of the ducts D' in one vertical line to form one upright and continuous duct. The right and left handed arrangement permits the longer tongues of one tier to overlap the longer tongues of the other vertically, and thereby cause the entire collection of structures to interlock in a vertical direction. Those columns of receptacle structures adjacent to the interior end walls E, which latter form the air spaces A², are all provided on the side adjacent to such wall with the long tongues, and these latter are caused to abut said wall E, thereby forming in conjunction with such wall the required vertical ducts the right and left handed structures, in so far as concerns these sides of receiving-crypt structures adjacent to the wall E, being therefore absent, but present throughout all other parts of the structure, as will be readily understood. All vertical ducts formed by the tongues and grooves which are located in the same longitudinal plane such plane being transverse with respect to the longitudinal direction of the crypt structures, communicate at their lower ends with one of the longitudinal horizontal ducts B′, as shown in Fig. 2.

Each receiving-crypt structure is provided with an inlet-opening $d^4$, which communicates with one of the deeper grooves in the corresponding side of the structure, as shown in Fig. 1, and is furthermore provided with an outlet-opening $d^5$, these inlet and outlet openings being placed near the bottom of one side of the crypt and near the top of the other side, respectively, as described in our above-named patent. Each of the inlet and outlet-openings communicates respectively with a vertical air-duct D′ located in a different longitudinal plane, so that the path of the air through any one crypt is independent of the path of the air through any other crypt. Each outlet-duct is plugged by means of a stop $d^6$ at a point below such outlet opening, so that these outlet ducts are cut off from communication below with the ducts B′. The top of the inlet-ducts are cut off from communication with the air-space above the crypt structures by means of slabs F, Fig. 1, suitable openings $f'$ being cut in these slabs to permit the outlet ducts to communicate with said air-space.

The front or open end of each receiving-crypt structure is grooved as at $d^7$, so that a horizontal slab G may be inserted between the projecting front ends of the structures to form a shelf for receiving and carrying flowers or wreaths. In the completed structure, these open front ends are closed by means of vertical slabs H, which are held in place by strips H′, Fig. 1.

By means of the above-described construction, it will be noted therefore that the receiving-crypt structures may be piled one upon the other to form tiers and columns which are interlocked vertically and in the longitudinal direction of the interior of the crypts. The bottoms of one tier of crypts forms the top of the next tier below, with the exception of the uppermost and lowermost tiers, the top of the uppermost tiers being formed by the slabs F, as previously described.

The surface of the interior bottom of each crypt is preferably grooved as shown, these grooves inclining from the front toward the rear and discharging in a common transverse groove which communicates with a vertical duct $d^8$, formed in the rear wall of the receiving-crypt structure, as shown in Fig. 4, in a manner heretofore well known, and understood, these ducts forming drains for carrying off any liquids which might possibly form or be present in the interior of the crypts.

Where it is desired to place a disinfecting or other similar material adjacent to the inlet and outlet openings of the crypts, a depression $d^{10}$ is formed in the corresponding wall, which forms a receptacle for such disinfectant immediately below the opening. In order to supply the disinfecting material to such receptacle, a duct $d^{11}$ may be formed in such wall, extending from the receptacle to the front of the crypt, where it may be plugged by means of a suitable stopper $d^{12}$, as will be readily understood.

Having fully described our invention, what we claim therefore and desire to secure by Letters Patent is:

1. As a new article of manufacture, a receiving crypt structure of integral form having an open top and end, and having its walls exteriorly grooved, whereby laterally adjacent structures will form air-ducts; one or more of said grooves being provided with a stop adapted to form the terminus of one of such air ducts.

2. As a new article of manufacture, a receiving-crypt structure of integral form, and having its lateral walls exteriorly grooved, whereby laterally adjacent structures will form air-ducts; the grooves in one side of said structure being of greater depth than those upon the other side.

3. As a new article of manufacture, a receiving-crypt structure of integral form having its lateral walls formed with a plurality of vertical parallel grooves, whereby juxtaposed structures will form a plurality of vertical parallel air-ducts; the grooves on one side of said structure being of greater depth than those upon the other.

4. As a new article of manufacture, a receiving-crypt structure of integral form and having its lateral walls formed with a plurality of parallel exterior tongues and grooves, the outer faces of said tongues being concave.

5. In a mausoleum, a plurality of receiving-crypt structures forming superposed tiers and adjacent columns, said structures being formed with lateral parallel tongues and grooves, the tongues and grooves of adjacent structures interlocking with each other, and being of different depth, whereby air-ducts are formed by such structures.

6. In a mausoleum, a plurality of adjacent receiving-crypt structures provided with engaging tongues and grooves; the opposing faces of some of such tongues and grooves being concave, to form a space for the reception of the binder; and some of said tongues and grooves being of different depths and interlocking with each other, whereby they form lateral air-ducts.

7. In a mausoleum, a receiving-crypt structure in which the bottom, side and one end wall are integral with each other, said side-walls being vertically grooved exteriorly, one of said side-walls being formed with an opening therethrough communicating with one of said grooves and with the structure's interior.

8. In a mausoleum, a receiving-crypt structure in which the bottom, side and one end wall are integral with each other, said side walls being vertically grooved exteriorly; one of said walls being formed with an opening therethrough communicating with one of said grooves and with the structure's interior, and with a receptacle beneath such opening for receiving a disinfecting or similar material.

9. In a mausoleum, the combination with an exterior wall provided with an opening therethrough, and forming a chamber; of a drawer in said chamber provided with an air-drying material and removed from the walls of said chamber, whereby air may pass through said chamber over said drawer and material; said drawer being provided upon the exterior with an inclined weather strip.

10. In a mausoleum, the combination of an outer wall provided with an opening therethrough; a drawer in said opening and provided with an interior perforate tray containing a drying material; a duct on the interior of said wall and communicating with said opening below said tray, whereby liquid from said tray may be caught by the bottom of the opening and conducted into said duct.

Signed by us, this 23 day of October, 1909.

JAMES B. KING.
WILLIAM E. HUGHES.

Attested by—
 JOHN E. MARK,
 ABE SWANSON.

Signed by me, this 22nd day of October, 1909.

FRANK W. HALL.

Attested by—
 W. T. CURTIS,
 HARVEY S. DURAND.